(12) United States Patent
Steensma et al.

(10) Patent No.: US 12,297,118 B2
(45) Date of Patent: May 13, 2025

(54) PROCESS FOR PRODUCING SALT FROM WASTE AQUEOUS STREAMS OF ORGANIC PEROXIDES PRODUCTION

(71) Applicant: NOURYON CHEMICALS INTERNATIONAL B.V., Arnhem (NL)

(72) Inventors: Maria Steensma, Arnhem (NL); Martinus Catharinus Tammer, Diepenveen (NL); Claus Decker, Emmerich am Rhein (DE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 911 days.

(21) Appl. No.: 17/310,327

(22) PCT Filed: Jan. 28, 2020

(86) PCT No.: PCT/EP2020/052039
§ 371 (c)(1),
(2) Date: Jul. 28, 2021

(87) PCT Pub. No.: WO2020/157061
PCT Pub. Date: Aug. 6, 2020

(65) Prior Publication Data
US 2022/0081307 A1    Mar. 17, 2022

(30) Foreign Application Priority Data
Jan. 31, 2019    (EP) ..................................... 19154884

(51) Int. Cl.
*C01D 3/06*    (2006.01)
*B01D 3/38*    (2006.01)
*B01D 11/04*   (2006.01)

(52) U.S. Cl.
CPC ................. *C01D 3/06* (2013.01); *B01D 3/38* (2013.01); *B01D 11/0492* (2013.01); *B01D 2257/708* (2013.01); *C01P 2006/82* (2013.01)

(58) Field of Classification Search
CPC ........ C01D 3/06; B01D 3/38; B01D 11/0492; B01D 2257/708; C01P 2006/82
USPC .......................................................... 23/303
See application file for complete search history.

(56) References Cited

U.S. PATENT DOCUMENTS

| | | |
|---|---|---|
| 2010/0219372 A1 | 9/2010 | Hook et al. |
| 2012/0205284 A1 | 8/2012 | Harvey |
| 2013/0313199 A1 | 11/2013 | Marcin et al. |

FOREIGN PATENT DOCUMENTS

| | | |
|---|---|---|
| CN | 01378995 A | 3/2009 |
| CN | 101631772 A | 1/2010 |
| CN | 101784479 A | 7/2010 |
| CN | 102963971 A | 3/2013 |
| CN | 103787442 A | 5/2014 |
| CN | 104876379 A | 9/2015 |
| CN | 108423908 A | 8/2018 |
| JP | 10156336 A | 6/1998 |

*Primary Examiner* — Edward M Johnson
(74) *Attorney, Agent, or Firm* — LKGLOBAL | Lorenz & Kopf, LLP

(57) ABSTRACT

Process for producing a salt comprising NaCl and/or KCl from the aqueous effluents from one or more organic peroxide production processes, said process comprising the following steps (a) ensuring the pH of the aqueous effluents to be in the range from about 1-5, (b) separating the effluents in a liquid organic layer and an aqueous layer, (c) removing the organic layer, (d) raising the pH of the aqueous layer to a value in the range from about 6-14, and (e) crystallizing the salt from the aqueous layer having a pH in the range from about 6-14.

20 Claims, No Drawings

PROCESS FOR PRODUCING SALT FROM WASTE AQUEOUS STREAMS OF ORGANIC PEROXIDES PRODUCTION

CROSS-REFERENCE TO RELATED APPLICATION

This application is a U.S. National-Stage entry under 35 U.S.C. § 371 based on International Application No. PCT/EP2020/052039, filed Jan. 28, 2020 which was published under PCT Article 21(2) and which claims priority to European Application No. 19154884.1, filed Jan. 31, 2019, which are all hereby incorporated in their entirety by reference.

BACKGROUND

CN108423908 discloses a process in which effluents from an organic peroxide process are treated, the process comprising the steps of acidifying the effluents, isolating 4-methylbenzoic acid in solid form by precipitation and increasing the pH of the remaining fluid to a value of between 5 and 7, and next isolating NaCl by a precipitation step. The purpose of the process as disclosed in CN108423908 is mostly the isolation and recovery of unreacted 4-methylbenzoic acid and not primarily the recovery of salt in high purity.

BRIEF SUMMARY

This disclosure provides a process for producing a salt comprising NaCl and/or KCl from the aqueous effluents from one or more organic peroxide production processes, said process comprising the following steps:
  a) ensuring the pH of the aqueous effluents to be from about 1-about 5,
  b) separating the effluents in a liquid organic layer and an aqueous layer,
  c) removing the organic layer,
  d) raising the pH of the aqueous layer to a value from about 6-about 14,
  e) crystallizing the salt from the aqueous layer having a pH from about 6-about 14.

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description.

The present disclosure relates to a process for producing salt, more in particular NaCl and/or KCl-containing salt, from chemical production process effluents, more in particular organic peroxide production effluents.

The production of various organic peroxides, such as diacyl peroxides, peroxyesters, and peroxydicarbonates, involves the reaction of an acid chloride or chloroformate with an organic hydroperoxide or $H_2O_2$ under alkaline conditions. Depending on the specific process, the alkaline conditions are obtained by the addition of NaOH, KOH, or a combination thereof.

As a side-product, a significant amount of salt (KCl and/or NaCl) is formed. Also other salts, such as $Na_2SO_4$, may be present. The high salt concentration is generally such that direct processing of the aqueous salt-containing effluents to a biological waste water treatment unit is not allowed.

Instead of diluting the effluents, it is more attractive from an environmental and economical perspective, to isolate the salt in such a form that it can find use in other processes, such as textile production, leather tanning, or chlor-alkali processes.

The salt(s) may be recovered by conventional evaporative crystallization. However, direct processing of the effluents in such a system leads to safety and operating issues. First of all, a dangerously concentrated organic peroxide residue phase may be formed in the crystallizer. Furthermore, the resulting salt may contain peroxide residues and/or high organic impurity levels that either preclude it from re-use or may lead to health and safety issues upon re-use of salt. In addition, settling of benzoic acid residues, present in effluents from processes using benzoyl chloride as reactant, may cause scaling and purging problems. And finally, higher carboxylic acids (≥about 8 carbon atoms) or their salts, present in effluents from processes using higher acid chlorides as reactant, may end up in the aqueous layer and may cause foaming, thereby decreasing the capacity of the crystallizer.

In order for the salt to be suitable for re-use, it should not contain more than about 1000 ppm, preferably not more than about 500 ppm, even more preferably not more than about 300 ppm, and most preferably not more than about 200 ppm of organic impurities, based on the weight of dry salt. This content of organic impurities is defined as the non-purgeable organic compound (NPOC) content, which can be determined as described in the examples below.

It has now been found that, in order to mitigate these problems and to obtain a salt that is suitable for re-use, the effluent is first acidified to a pH in the range from about 1-about 5, an organic liquid layer is subsequently separated off, and the pH of the effluent is then raised again to a value in the range from about 6-about 14.

The acidification allows benzoic acid and higher carboxylic acids, commonly present in the process streams when producing organic peroxides, into the organic layer, which allows their separation from the aqueous layer before crystallization. The subsequent high pH serves to prevent corrosion of stainless steel crystallization equipment and/or to prevent precipitation of organic acids.

The present disclosure therefore relates to a process for producing a salt comprising NaCl and/or KCl from the aqueous effluents from one or more organic peroxide production processes, said process comprising the following steps:
  a) ensuring the pH of the aqueous effluents to be in the range from about 1-about 5,
  b) separating the effluents in a liquid organic layer and an aqueous layer,
  c) removing the liquid organic layer,
  d) raising the pH of the aqueous layer to a value in the range from about 6-about 14,
  e) crystallizing the salt from the aqueous layer having a pH in the range from about 6-about 14.

It has been surprisingly found that when in step b) the separation is a liquid-liquid separation wherein an organic and an aqueous liquid phase are separated, the purity of the salt as isolated is clearly improved, the salt contains a significant lower amount of (non-purgeable) organics than in the process disclosed in CN108423908. Alternatively said, would in the process of CN108423908 one wish to obtain salt with an increased low organics amount, further purification steps would be needed which would make the process unattractive and lead to isolation of less of such salt as any purification step will go with loss of some yield.

The aqueous effluents result from the production of a diacyl peroxide, peroxyester, peroxycarbonate, or peroxydicarbonate by reacting an acid chloride or chloroformate with an organic hydroperoxide or H2O2 under alkaline conditions.

Examples of peroxyesters are tert-butyl peroxybenzoate, tert-amyl peroxybenzoate, cumyl peroxybenzoate, 1,1,3,3-tetramethylbutyl peroxybenzoate tert-butylperoxy isobutyrate, tertamylperoxy isobutyrate, 1,1,3,3-tetramethylbutyl peroxyisobutyrate, cumyl peroxyisobutyrate, cumyl peroxyneodecanoate, 1,1,3,3-tetramethylbutyl peroxyneodecanoate, tert-amyl peroxyneodecanoate, tert-butyl peroxyneodecanoate, 1,1,3,3-tetramethylbutyl peroxypivalate, tert-amyl peroxypivalate, tert-butyl peroxypivalate, cumyl peroxypivalate 1,1,3,3-tetramethylbutyl peroxy-2-ethylhexanoate, tert-amyl peroxy-2-ethylhexanoate, tert-butyl peroxy-2-ethylhexanoate, cumyl peroxy-2-ethylhexanoate tert-amyl peroxyacetate, tert-butyl peroxyacetate, cumyl peroxyacetate, tert-butyl peroxy-3,5,5-trimethylhexanoate, tert-amyl peroxy-3,5,5-trimethylhexanoate, and cumyl peroxy-3,5,5-trimethylhexanoate.

Preferred peroxyesters are tert-amyl peroxypivalate, tert-butyl peroxypivalate, tert-amyl peroxy-2-ethylhexanoate, tert-butyl peroxy-2-ethylhexanoate, tert-butyl peroxy-3,5,5-trimethylhexanoate, cumyl peroxyneodecanoate, and tert-butyl peroxyneodecanoate.

Examples of peroxycarbonates are tert-butyl peroxy-2-ethylhexyl carbonate, tert-amyl peroxy-2-ethylhexyl carbonate, cumyl peroxy-2-ethylhexyl carbonate, tert-butyl peroxy-2-ethylhexyl carbonate, 1,1,3,3-tetramethylbutyl peroxy-2-ethylhexyl carbonate, tert-butyl peroxyisopropylcarbonate, tert-amyl peroxyisopropylcarbonate, cumyl peroxyisopropylcarbonate, tert-butyl peroxyisopropylcarbonate, and 1,1,3,3-tetramethylbutyl peroxyisopropyl carbonate. A preferred peroxycarbonate is tert-butyl peroxy-2-ethylhexyl carbonate.

Examples of diacyl peroxides are di-isobutyryl peroxide, di-n-butyryl peroxide, di-isopentanoyl peroxide, di-n-pentanoyl peroxide, di-2-methylbutanoyl peroxide, di-hexanoyl peroxide, di-octanoyl peroxide, dibenzoyl peroxide, acetyl isobutyryl peroxide, cyclohexylcarbonyl acetyl peroxide, acetyl benzoyl peroxide, lauroyl acetyl peroxide, hexanoyl acetyl peroxide, propionyl isobutyryl chloride, propionyl benzoyl peroxide, di(p-methylbenzoyl) peroxide, di(o-methylbenzoyl) peroxide, dilauroyl peroxide, di(3,5,5-trimethylhexanoyl) peroxide, and didecanoyl peroxide.

Preferred diacyl peroxides are di-isobutyryl peroxide, acetyl isobutyryl peroxide, dibenzoyl peroxide, di(p-methylbenzoyl) peroxide, di(o-methylbenzoyl) peroxide, dilauroyl peroxide, and di(3,5,5-trimethylhexanoyl) peroxide.

Examples of peroxydicarbonates are di(3-methoxybutyl) peroxydicarbonate, di(2-ethylhexyl)peroxydicarbonate, di-sec-butyl peroxydicarbonate, diisopropyl peroxydicarbonate, dicetyl peroxydicarbonate, di-(4-tert-butylcyclohexyl) peroxydicarbonate, dimyristyl peroxydicarbonate, and di(2-propylheptyl)peroxydicarbonate.

A preferred peroxydicarbonate is di(2-ethylhexyl)peroxydicarbonate.

The aqueous effluents from one individual peroxide production process can be used in the process of the present disclosure, but it is also possible to use a mixture of aqueous effluents from two or more peroxide production processes.

The advantage of using such a mixture is that the (combined) liquid organic phase that is formed and is removed in step b) may serve as extraction solvent for water-soluble organic impurities from the aqueous layer of said mixture.

The aqueous effluents to be used in the process of the present disclosure generally contain more than about 3 wt %, more preferably more than about 7 wt %, even more preferably more than about 12 wt % of a salt comprising NaCl and/or KCl.

The concentration of organic species in the effluents generally amounts from about 0.1-about 10 wt %, more preferably about 0.3-about 7 wt %, most preferably about 0.5-about 4 wt %. Part of these organics includes organic (hydro)peroxide residues. These residues are generally present in the effluents in a concentration of about 0.01 to about 4 wt %, preferably about 0.05 to about 3 wt %, most preferably about 0.1 to about 2.5 wt %.

Other organic species that can be present in such effluents are peroxide decomposition products (such as acetone, methanol, methylethylketone, ethanol, tert-butanol, or tert-amylalcohol) and solvents (e.g. dimethylphthalate, isododecane, odorless mineral spirits, ethyl acetate, or toluene).

The pH of the effluents to be used in the process is preferably at least 8, even more preferably at least about 10, most preferably at least about 11.

Step a)

Step a) requires ensuring that the pH of the aqueous effluents is in the range from about 1-about 5, preferably in the range from about 2-about 4. This means that if the pH is already in that range, no action is required.

However, since the effluents result from processes performed under alkaline conditions, it will generally be required to lower the pH by the addition of acid.

Although many acids can be used, it is preferred to use HCl for effluents containing chloride anions. Should the effluents also contain sulfate anions, H2SO4 or NaHSO4 can suitably be used.

Step b)

The acidification of step a) will generally result in the formation of a liquid organic phase. Prior to or during the acidification step a) organic solvent may optionally be added. If no or hardly any liquid organic phase is formed, it is desired to add an organic solvent prior to or during acidification step a) in order to extract organics from the effluent, thereby decreasing fouling and improving the separation of the phases and the safety characteristics of the organic layer. In embodiments wherein the formation of liquid organic phase is so small that no good liquid-liquid separation can be done, organic solvent is added.

This organic solvent is preferably a polar solvent with only limited solubility in water. Examples of suitable solvents are lower phthalates, C6-18 carboxylic acids, C6-18 alcohols, esters with more than about 5 carbon atoms, ethers with more than about 5 carbon atoms, alkanes with more than about 5 carbon atoms, aromatic compounds with more than about 6 carbons, and mixtures of such solvents. Specific examples are 2-ethylhexanol, dimethyl phthalate, oleic acid, diesel oil, isomeric C12-mixtures (e.g. isododecane), mixtures of esters containing dimethyl adipate or diethyladipate, dioctyl adipate, dibutyl sebacate, dibutyl maleate, ethyl benzoate, toluene, xylene, and mixtures thereof.

The liquid organic layer will contain most of the organic components that were present in the effluent, including organic peroxide residues, benzoic acid, alcohols, and higher carboxylic acids.

Step c)

The liquid organic layer that is formed in step b) is removed from the aqueous layer. This can be done in various ways. For instance, it can be performed by gravity settling followed by decanting the upper layer. It can also be done with an oil skimmer, i.e. a device containing a rotating belt or a slowly moving scraper that dips into the organic layer and removes it. The liquid organic layer can also be removed by a liquid-liquid separator, by the application of centrifugal force, by plate separators, by floatation, or by extraction.

The removed liquid organic layer can be transferred to a biological waste water treatment unit; as-is or dispersed in (alkaline) water. The organic layer can also be disposed of as organic liquid waste or, after washing and/or neutralizing, used as fuel. If an organic solvent is added during step b, the organic layer in a preferred embodiment is, optionally purified e.g. by washing with an aqueous alkaline solution, re-used as extraction solvent in step b).

If desired, volatile organic compounds, such as acetone, methanol, acetic acid, formic acid, isobutyric acid, n-butyric acid, pivalic acid, tert-amyl hydroperoxide, and tert-butyl hydroperoxide, may be removed by steam stripping. This can be done after acidification step a) and before or after removal of the liquid organic layer.

Steam stripping is generally conducted within a temperature range of from about 90-about 120° C. and a pressure of about 0.1-about 0.2 Mpa.

The resulting vapor stream can be condensed and sent to a biological waste water treatment unit.

Step d)

After separating off the liquid organic layer, the pH of the aqueous layer is increased to a value in the range from about 6-about 14, preferably about 7-about 13, more preferably about 8-about 13, even more preferably about 9-about 13, and most preferably about 11-about 13, in order to prevent corrosion of the crystallization equipment used in step e) and/or to prevent precipitation of organic acids.

The pH is preferably raised by the addition of KOH or NaOH.

Step e)

The salt can be crystallized in various ways. One of these ways is evaporative crystallization. The crystallization temperature and pressure depend on the boiling temperature of the salt solution and on the crystallizer configuration. The temperature will generally be between about 50 and about 150° C.; the pressure between about 50 mbar and about 4 bar.

The crystallizer can be any of the conventional types, such as a forced-circulation crystallizer powered by Mechanical Vapor Recompression (MVR) or a steam-powered single-effect or multi-effect crystallizer, optionally combined with Thermal Vapor Recompression (TVR); or simply a spray dryer.

For KCl crystallization, cooling crystallization is also possible.

For NaCl crystallization, a 2-effect or 3-effect steam-powered crystallizer or an MVR is preferred.

Crystallization results in a salt slurry. If required for quality reasons, this slurry can be washed using, e.g., a (pusher) centrifuge, elutriation leg, wash column or wash vessel. Washing can be done with clean water or with a brine, for instance the brine from a previous wash cycle. The salt is collected from the slurry as 'wet salt' by employing gravity settling, centrifugation, filtration, or any other suitable solid-liquid separation technique. The filtrate may be disposed of or (partly) recycled to step a) or step e).

The wet salt may also in an embodiment be washed on a filter or another suitable piece of equipment after it has been separated from the adhering liquid.

If desired, the resulting (washed or non-washed) 'wet' salt can be dried. Drying can be performed in any conventional dryer, for instance a fluid bed dryer or a belt dryer.

The resulting salt preferably has a moisture content of less than about 10 wt %, more preferably less than about 5%, and after drying preferably less than about 0.5 wt %.

It preferably contains, based on dry salt weight, less than about 1000 ppm, more preferably less than about 500 ppm, even more preferably not more than about 300 ppm, and most preferably not more than about 200 ppm of non-purgeable organic compounds (NPOC), so that it is suitable for re-use.

If desired, an anti-caking agent can be added to the salt. Examples of anti-caking agents are sodium hexacyanoferrate (yellow prussiate of soda, YPS), or silica.

Anti-caking agents are generally added in amounts of from about 5-about 100 ppm.

The obtained salt can be used disposed of as waste, but is preferably re-used. It can be re-used in various applications, such as textile production, leather tanning, fertilization, or chlor-alkali processes.

EXAMPLES

In all Examples, the NPOC was measured using a Shimadzu TOC (total organic carbon) analyzer. First, salt was dissolved in water and made acidic by adding HCl, after which it was purged with N2. After that, the sample was combusted at 680° C. in a tube, in presence of a Pt-catalyst. The formed CO2 was determined with a nondispersive infrared (NDIR) detector and the amount of carbon was calculated versus an external standard (potassium hydrogen phthalate).

Example 1

30 l of a mixture of several aqueous waste streams from organic peroxide production processes were added to a pilot scale reactor. The mixture had a pH of 10.5 and the following approximate composition:

| NaCl | 15 wt % |
| Sodium benzoate | 1 wt % |
| Sodium 2-ethylhexanoate | 2 wt % |
| Tert-butyl hydroperoxide | 2 wt % |
| Water | balance |

The mixture was acidified to pH 2.5 by the addition of a 30 wt % HCl solution, followed by the addition of 0.5 wt % dimethylphthalate (based on the total weight of the mixture). A clear organic layer was obtained that could be easily separated from the aqueous phase.

A 30 wt % NaOH solution was added to the resulting aqueous phase, until the pH was 10.5. The mixture was then transferred to a pilot scale batch crystallizer, heated to about 110° C., at a pressure of 1 bar. During crystallization, water vapor was removed from the top. After some time, NaCl crystals started to form. The resulting salt slurry was transferred to a centrifuge. During centrifugation, the salt was washed with a total wash water flow of 200 ml/kg salt. The resulting NaCl had a water content of 4 wt % and a non-purgeable organic carbon (NPOC) content of 233 ppm.

Example 2

30 l of a mixture of several aqueous waste streams from organic peroxide production processes was added to a pilot scale reactor. The mixture had a pH of about 11 and the following approximate composition:

| KCl | 15 wt % |
| --- | --- |
| Sodium neodecanoate | 2 wt % |
| Cumyl hydroperoxide | 1.5 wt % |
| Water | balance |

The mixture was acidified to pH 2.5 by the addition of a 30 wt % HCl solution. A clear liquid organic layer was formed on top of an aqueous phase. This organic layer was separated from the aqueous phase by using a small scale oil skimmer (ex-Abanaki).

A 30 wt % KOH solution was added to the resulting aqueous phase, until the pH was 10.5. The mixture was then transferred to a pilot scale batch crystallizer, heated to about 50° C., at a pressure of 60 mbar. During crystallization, water vapor was removed from the top. After some time, KCl crystals started to form. The resulting salt slurry was transferred to a centrifuge. During centrifugation, the salt was washed with a total wash water flow of 300 ml/kg salt. The resulting KCl had a water content of 4 wt % and an NPOC content of 215 ppm. The KCl was transferred to a pilot-scale fluid bed dryer. The resulting dried salt had a water content of 0.2 wt %.

Example 3

30 l of a mixture of several aqueous waste streams from organic peroxide production processes was added to a pilot scale reactor. The mixture had the following approximate composition:

| NaCl | 15 wt % |
| --- | --- |
| Sodium benzoate | 0.3 wt % |
| Sodium 2-ethylhexanoate | 2 wt % |
| Tert-butyl hydroperoxide | 2 wt % |
| Water | Balance |

The mixture was acidified to pH 2.5 by the addition of a 30 wt % HCl solution and the organic layer obtained in Example 2 was added. A clear organic layer was obtained that could be easily separated from the aqueous phase.

A 30 wt % NaOH solution was added to the resulting aqueous phase, until the pH was 10.5. The mixture was then transferred to a pilot scale batch crystallizer, heated to about 110° C., at a pressure of 1 bar. During crystallization, water vapor was removed from the top. After some time, NaCl crystals started to form. The resulting salt slurry was transferred to a centrifuge. During centrifugation, the salt was washed with a total wash water flow of 400 ml/kg salt. The resulting NaCl had a water content of 4 wt % and an NPOC content of 177 ppm.

Example 4

30 l of a mixture of several aqueous waste streams from organic peroxide production processes was added to a pilot scale reactor. The mixture had the following approximate composition:

| NaCl | 15 wt % |
| --- | --- |
| KCl | 3 wt % |
| Na2SO4 | 2 wt % |
| Mixed organics | 4 wt % |
| Water | balance |

The mixture was acidified to pH 2.5 by the addition of a 30 wt % HCl solution. A clear liquid organic layer was formed on top of an aqueous phase. The organic layer was separated from the water phase.

A 30 wt % NaOH solution was added to the resulting aqueous phase, until the pH was 10.5. The mixture was then transferred to a pilot scale batch crystallizer, heated to about 110° C., at a pressure of 1 bar. During crystallization, water vapor was removed from the top. After some time, salt crystals started to form. The resulting salt slurry was transferred to a centrifuge. The resulting salt mixture had a water content of 6 wt % and an NPOC content of 760 ppm.

Comparative Example 5

30 l of the mixture of waste streams used in Example 1 was transferred to a pilot scale batch crystallizer, heated to about 110° C., at a pressure of 1 bar. After some time NaCl crystals started to form. Around the same time, precipitates of sodium benzoate started to form. It was attempted to continue crystallization until a reasonable slurry density had formed, but the sodium benzoate and other precipitates were plugging the equipment. The slurry could not be centrifuged to a water content <10% because the salt/organic mixture did not dewater well.

This experiment illustrates that the acidification step performed in Example 1 is essential for proper isolation of the salt.

Comparative Example 6

30 l of the mixture of waste streams used in Example 2 was transferred to a pilot scale batch crystallizer, heated to about 50° C., at a pressure of 60 mbar. During crystallization, water vapor was removed from the top. After some time, KCl crystals started to form. The resulting salt slurry was transferred to a centrifuge. In the centrifuge, foaming was observed, which resulted in slow and incomplete centrifugation. It was attempted to wash the salt with a total wash water flow of 300 ml/kg salt. The salt was transferred to a pilot-scale fluid bed dryer. The resulting dried salt had an NPOC content of 2600 ppm.

This experiment illustrates that the acidification step performed in Example 2 is essential for obtaining a salt with sufficiently low organics content.

Example 7

Dibenzoyl peroxide was made with benzoyl chloride, $H_2O_2$—30%, NaOH—25% and a surfactant. The reaction mixture was filtered to separate the product and the water layer. The water layer had the following composition:

| NaCl | 7 wt % |
| --- | --- |
| Sodium benzoate | 0.6 wt % |
| Sodium perbenzoate | 0.03 wt % |
| Water | balance |

To 100.4 g of the water layer with a pH of >6, as measured with a Knick pH meter and a Mettler Toledo Inlab pH electrode, 8.04 g dimethyl phthalate (DMP) was added. The combined mixture was acidified under stirring at 20-25° C. to pH 2.3 by the addition of a 0.84 g 18 wt % HCl solution. After continuing stirring for 5 more minutes the layers were allowed to separate. The lower DMP layer was separated from the water layer. The obtained water phase with a benzoic acid content of 0.07% was neutralized with 30 wt % NaOH solution to a pH>7. The mixture was then transferred to a batch crystallizer, heated to about 110° C., at a pressure of 1 bar. During crystallization, water vapor was removed from the top. After some time, salt crystals started to form. The resulting salt slurry was transferred to a centrifuge. The obtained salt had a water content of 6 wt % and an NPOC content of 620 ppm. The DMP layer was washed with a 3% NaOH solution until pH>7 and was reused in the extraction of benzoic acid.

Comparative Example 8

77.3 g of the water layer of the benzoyl peroxide process as in Example 7 was acidified under stirring at 20-25° C. to pH 2.3 by the addition of a 0.64 g 18 wt % HCl solution. A white precipitate was formed in the aqueous phase. After continuing stirring for 5 more minutes the solid was filtered. The obtained clear water phase with a benzoic acid content of 0.17% was neutralized with 30 wt % NaOH solution to a pH>7. The mixture was then transferred to a batch crystallizer, heated to about 110° C., at a pressure of 1 bar. During crystallization, water vapor was removed from the top. After some time, salt crystals started to form. The resulting salt slurry was transferred to a centrifuge. The obtained salt had a water content of 6 wt % and an NPOC content of 1490 ppm.

This experiment illustrates that the addition of a solvent in the acidification step performed in Example 7, and the following liquid-liquid separation are essential for obtaining a salt with sufficiently low organics content.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. Process for producing a salt comprising NaCl and/or KCl from aqueous effluents from one or more organic peroxide production processes, said process comprising the following steps:
    a) ensuring the pH of the aqueous effluents to be from about 1-about 5,
    b) separating the effluents in a liquid organic layer and an aqueous layer,
    c) removing the organic layer,
    d) raising the pH of the aqueous layer to a value from about 6-about 14,
    e) crystallizing the salt from the aqueous layer having a pH from about 6-about 14,
    wherein step c) comprises using an oil skimmer.

2. Process according to claim 1 wherein step a) comprises acidification of the effluents to a pH from about 1-about 4.

3. Process according to claim 2 wherein HCl is used for the acidification.

4. Process according to claim 1 wherein, prior to step d), the aqueous layer is subjected to steam stripping to remove volatile organic compounds.

5. Process according to claim 4 wherein the volatile organic compounds comprise isobutyric acid, n-butyric acid, pivalic acid, tert-amyl hydroperoxide, and/or tert-butyl hydroperoxide.

6. Process according claim 1 wherein an organic solvent is added before or during step b).

7. Process according to claim 6 wherein the organic layer collected in step c) is recycled and reused as the organic solvent.

8. Process according to claim 1 wherein step e) comprises subjecting the aqueous phase to evaporation, thereby crystallizing the salt to form a salt slurry.

9. Process according to claim 1 wherein the salt obtained in step e) is dried to a moisture content below about 0.5 wt %.

10. Process according to claim 6 wherein the organic layer collected in step c) is recycled and reused as the organic solvent after being washed with an alkaline aqueous solution.

11. Process according to claim 2 wherein, prior to step d), the aqueous layer is subjected to steam stripping to remove volatile organic compounds.

12. Process according to claim 3 wherein, prior to step d), the aqueous layer is subjected to steam stripping to remove volatile organic compounds.

13. Process according claim 2 wherein an organic solvent is added before or during step b).

14. Process according to claim 13 wherein the organic layer collected in step c) is recycled and reused as the organic solvent after being washed with an alkaline aqueous solution.

15. Process according claim 3 wherein an organic solvent is added before or during step b).

16. Process according to claim 15 wherein the organic layer collected in step c) is recycled and reused as the organic solvent after being washed with an alkaline aqueous solution.

17. Process according claim 4 wherein an organic solvent is added before or during step b).

18. Process according to claim 17 wherein the organic layer collected in step c) is recycled and reused as the organic solvent after being washed with an alkaline aqueous solution.

19. Process according to claim 5 wherein an organic solvent is added before or during step b) and wherein the organic layer collected in step c) is recycled and reused as the organic solvent after being washed with an alkaline aqueous solution.

20. Process according to claim 1 wherein:
    step a) comprises acidification of the effluents to a pH from about 1-about 4 using HCl;
    an organic solvent is added before or during step b); and
    the organic layer collected in step c) is recycled and reused as the organic solvent.

* * * * *